United States Patent
Zoppitelli et al.

(10) Patent No.: US 6,695,254 B2
(45) Date of Patent: Feb. 24, 2004

(54) ROTARY-WING AIRCRAFT ROTOR WITH CONSTANT VELOCITY DRIVE

(75) Inventors: Elio Zoppitelli, Velaux (FR); Etienne Rampal, Marseilles (FR)

(73) Assignee: Eurocopter, Marignane Cedex (FR)

( * ) Notice: Subject to any disclaimer, the term of this patent is extended or adjusted under 35 U.S.C. 154(b) by 0 days.

(21) Appl. No.: 10/378,003

(22) Filed: Feb. 28, 2003

(65) Prior Publication Data

US 2003/0178528 A1 Sep. 25, 2003

(30) Foreign Application Priority Data

Mar. 20, 2002 (FR) .......................................... 02 03464

(51) Int. Cl.⁷ .............................................. B64C 11/04
(52) U.S. Cl. ................... 244/17.11; 244/17.25; 244/17.27; 244/7 R; 416/148
(58) Field of Search .................. 244/17.11, 17.25, 244/17.27, 6–7 C, 56, 66; 416/148, 140, 103, 20 R, 125

(56) References Cited

U.S. PATENT DOCUMENTS

| | | | | |
|---|---|---|---|---|
| 2,264,942 A | * | 12/1941 | Larsen | 416/148 |
| 2,827,777 A | | 3/1958 | Molyneux et al. | |
| 2,971,586 A | * | 2/1961 | Schon | 416/148 |
| 3,204,700 A | * | 9/1965 | Milligan | 416/148 |
| 3,486,717 A | * | 12/1969 | Paine | 244/7 R |
| 3,804,552 A | | 4/1974 | Covington | |
| 5,145,321 A | | 9/1992 | Flux et al. | |
| 5,165,853 A | | 11/1992 | Pancotti | |
| 6,030,177 A | * | 2/2000 | Hager | 244/56 |
| 6,260,793 B1 | | 7/2001 | Balayn et al. | |
| 6,276,633 B1 | | 8/2001 | Balayn et al. | |

FOREIGN PATENT DOCUMENTS

WO    WO01/19673    3/2001

* cited by examiner

Primary Examiner—Galen L. Barefoot
(74) Attorney, Agent, or Firm—Sturm & Fix LLP

(57) ABSTRACT

A tilting rotor of a convertible aircraft comprises, between the mast and the hub, a constant velocity drive mechanism and pivoting arrangement comprising two gimbals, each of which is driven by the mast and pivots about one respectively of two diametral axes by two diametrically opposite bearings. Each gimbal is also hinged to the hub by ball joint connections diametrically opposite and centred respectively in a radial plane passing through the axis of the mast and through the diametral axis about which the other gimbal pivots. The two resulting trains transmitting torque between the mast and the hub have substantially the same torsional rigidity, and one at least of the components of each torque transmission train exhibits a flexibility in deformation about the axis of rotation of the hub.

22 Claims, 7 Drawing Sheets

ROTARY-WING AIRCRAFT ROTOR WITH CONSTANT VELOCITY DRIVE

FIELD OF THE INVENTION

The invention relates to a rotary-wing aircraft rotor with constant velocity drive, in particular for a convertible aircraft supporting two generally fixed wings and at least one tilting rotor.

Figure 1:
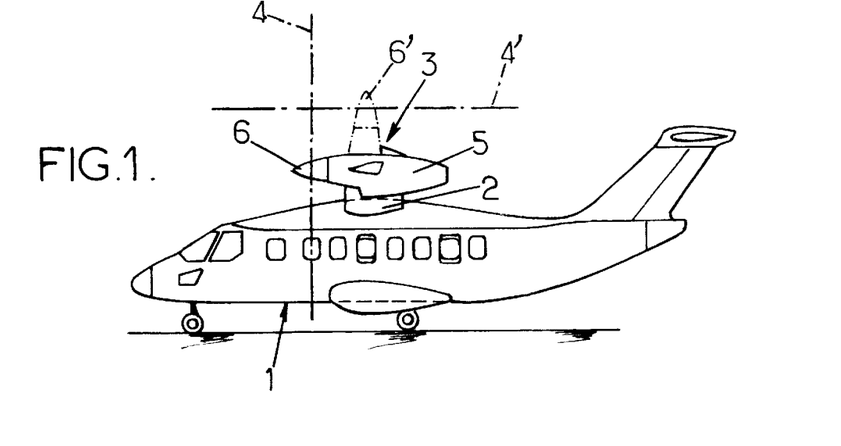
FIG. 1 shows schematically, in side elevation, a convertible aircraft with tilting rotors designed to be equipped with constant velocity drive rotors according to the invention.

Although the constant velocity drive rotor of the invention can be used as a helicopter rotor, in particular as a tail or anti-torque rotor, a particularly advantageous application of such a constant velocity drive rotor consists in fitting it to convertible aircraft with tilting rotors, particularly of the type known and described in FR 2 791 319, FR 2 791 634 and FR 2 798 359, to which reference may advantageously be made for further details. Briefly, such a convertible aircraft with tilting rotors comprises, as shown schematically in FIG. 1, a fuselage 1, of the aircraft fuselage type, supporting two fixed wings 2, for example high wings, raised with respect to the fuselage 1, each wing 2 itself supporting a power pod 3, housing a power unit driving in rotation a rotor 4, represented schematically by the plane of rotation of the rotor blades, via a transmission (not shown in FIG. 1), a rear reduction gear unit of which is directly driven by the power unit and housed like the latter in the stationary rear part 5 of the power pod 3. The front part 6 of the power pod 3, housing a rotor mast and a rotor hub, as well as a front reduction gear unit driving the rotor mast in rotation, is mounted so as to pivot with the rotor 4, so that it can pivot from an aeroplane configuration, in which the rotor 4 operates as a propeller at the front of an engine pod 5-6 facing into the relative wind, to a helicopter configuration, in which the rotor 4' operates as a helicopter main lifting rotor at the upper end of the front pivoting part of the pod in the upright position 6' above the corresponding wing 2, this latter configuration being used for takeoff and landing of the convertible aircraft which, after transition from the helicopter configuration to the aeroplane configuration, is able to move in forward flight like an aircraft. As a variant, the pods 3 may pivot totally with the rotor 4 with respect to the fixed wings 2.

BACKGROUND TO THE INVENTION

On rotary-wing aircraft rotors, it is known that, since the introduction of the flapping hinge on autogyro and helicopter rotors, tilting the rotor where coning is present, whether this tilting is desired and generated by controlling the cyclic pitch or the unwanted result of the asymmetry between an advancing blade and a retreating blade, causes stresses in the drive plane of the blades which tend to cause the blades to accelerate and decelerate in the course of a revolution of the rotor. These variations in speed are caused by Coriolis forces, and may be illustrated simply by the fact that the trajectory of the blade tips, viewed in a plane perpendicular to the drive axis, is an eccentric ellipse, the angular rate of travel of which is constant and, consequently, the peripheral speed of which varies over a revolution. These accelerations and decelerations of the blades over a revolution of rotation have a disastrous effect on the service life of the rotor components, due to the fact that these variations in speed generate stresses which are all the more substantial because the rigidity of the rotor components is high.

Conversely, it is known that great flexibility along the drag axis of the blades has a highly beneficial effect on the dynamic stresses to which the blades and the components of the rotor hub are subjected, which is why the introduction of the flapping hinge has been accompanied by the introduction of the drag hinge.

These improvements to the original rotary-wing aircraft rotor concepts have led to a rotor fully articulated in pitch, flapping and drag, the main disadvantage of which was to be subject to instability of the ground resonance or air resonance type, which made it necessary to develop and use drag dampers, also known as frequency adapters, or again elastic return drag struts with built-in damping. On helicopter rotors, these drag dampers are arranged in the plane of rotation of the rotor, between the blades and the hub of the rotor in a conventional configuration, or between adjacent blades of the rotor in the inter-blade configuration. In both cases, the presence of the drag dampers increases the aerodynamic drag of the rotor, in particular at the hub and where the hub is connected to the blades, which reduces the overall performance of the helicopter.

On a convertible aircraft of the tilting rotor type presented above, in which the speed of travel in the aeroplane mode is far higher than that of the helicopter, and on which drag dampers, mounted as on a helicopter rotor, would be head on to the wind, this reduction in performance would be far more appreciable, which is why designers of convertible aircraft of this type have endeavoured, for the design of the rotors, to retain hubs which are extremely rigid in drag (known as stiff-in-plane rotors), with no drag dampers, the natural drag frequency of which is greater than the nominal frequency of rotation of the rotor, which eliminates any risk of instability in drag, even in the absence of drag dampers.

However, it is known that rotors which are rigid in drag have the major disadvantage of generating very high stresses when the rotors are tilted. On convertible aircraft, the importance attached to producing rotors of high aerodynamic efficiency, and therefore with no drag dampers, has led to the development of hubs which are not sensitive to Coriolis forces. A particular feature of these hubs, which include hubs with a universal joint drive, is that tilting of the rotor is accompanied by tilting of the drive axis of the latter. Because of this, the rotor drive axis is always perpendicular to the rotor plane, and the trajectory described by the blade always remains a circle in a plane perpendicular to the drive axis of the rotor. This type of drive has been used on prototype convertible aircraft, particularly the XV15 aircraft.

However, a known particular feature of universal joints is that they are not of the constant velocity type, which manifests itself by the fact that the output speed of these joints is not always equal to the input speed. This speed distortion occurs when the drive and output axes are not co-linear, i.e. in the application considered to driving a rotor in rotation, when cyclic flapping is present. In the simplest configuration of a universal joint, the latter comprises a spider, the joints of which, by one arm of the spider to a driving shaft and by the other arm of the spider to a driven shaft, allow the driven or output shaft to swivel relative to the driving or input shaft. It is known that these speed variations caused by such a universal joint, and transmitted to the driven shaft, correspond to accelerations and decelerations which, over one revolution of rotation of the universal joint, appear twice. The speed of the driven shaft is therefore not constant, but varies at a frequency equal to twice the frequency of rotation of the shafts.

To eliminate these speed variations, which are responsible for very substantial inertial forces, in the case of a rotary-wing aircraft rotor, which affect the hub as a whole and are prejudicial to the durability of the mechanical assemblies constituting the hub or associated with the latter, several constant velocity drive systems have been proposed, particularly so-called Clemens drive links, composed of assemblies of two branches hinged respectively to the driving and driven shafts and connected by a swivel, and also tripod joints, for which transmission of movement is provided by means of balls moving in axial grooves machined in the driving and driven shafts.

These arrangements are used to ensure that the drive point is always situated in a plane bisecting the driving and driven axes. As the distances from this point to the two axes are then identical, the speeds of rotation of the two shafts are strictly equal whatever the angular position of the two shafts, which guarantees that the transmission provides a constant velocity drive.

These two known constant velocity drive systems are not suitable for application to convertible aircraft rotors for the following reasons:

installing Clemens drive links on a convertible aircraft rotor hub very substantially increases the drag of the hub, which reduces its performance and increases operating costs;

tripod joints in particular are not suitable because of the high torque levels encountered on convertible aircraft rotors, which require large diameter and therefore heavy balls to keep the contact surface Hertz pressures at acceptable levels.

In other arrangements, the swivelling and drive functions are kept separate. This is the case in the constant velocity drive system of the V22 tilting rotor convertible aircraft, in which the swivelling function is provided by two halves of a spherical laminated flapping thrust bearing enclosing the hub and connected to the rotor mast. This function absorbs the lift and the coplanar loads due to the aerodynamic and inertial excitation of the rotor. The mast drives the rotor (transmits the torque) by three drive links each connected at one end to the hub and at the other end to the mast.

A variant of this system is proposed in patent U.S. Pat. No. 5,145,321, in which the drive function is provided by substantially parallelepiped-shaped swivel bearings.

A particular feature of these separate means providing the swivelling and drive functions of the hub relative to the rotor mast is that they are kinematically not compatible in the absence of flexibility of the elements connecting the hub to the mast, and constant velocity drive is obtained only by careful tailoring of the rigidity of these connecting elements. Where cyclic flapping of the rotor is present, each drive link mentioned above is subject to dynamic stress at a frequency equal to twice the frequency of rotation of the rotor, the phase depending on the position of this link relative to the hub. For regularly spaced links, in a circumferential direction about the axis of rotation, the phase difference between the dynamic loads on the links is such that the contributions to the dynamic torque cancel each other out, which is a necessary and sufficient condition for constant velocity drive of the hub by the rotor mast. Another major disadvantage of this type of hub in addition to the disadvantage regarding the need for accurate tailoring of drive link rigidity is that the enclosing arrangement of the halves of the flapping thrust bearings make it difficult to inspect the links in particular and the torque transmission system in general, as well as impairing accessibility for maintenance purposes.

In patent U.S. Pat. No. 5,145,321 mentioned above, the vertical shear of a substantially parallelepiped-shaped swivel bearing allows the rotor to pivot about an axis perpendicular to the axis joining the centre of the swivel bearing to the rotor drive axis. Movement of the rotor about a second pivot axis is made possible by the ball joint fitted inside the parallelepiped-shaped bearing. In the same way as for a system where the hub is driven by the mast via links, as presented above, a minimum number of three bearings with closely similar levels of rigidity is required to obtain a constant velocity drive. The flexibility required for correct operation is also directed according to the direction of drive in rotation.

SUMMARY OF THE INVENTION

The problem addressed by the invention is to propose a constant velocity drive rotary-wing aircraft rotor, in particular for a convertible aircraft with at least one tilting rotor, the constant velocity drive mechanism of which has the following degrees of freedom:

two degrees of freedom of rotation about two coplanar axes, for pivoting of the hub and therefore of the rotor, no degrees of freedom in translation, which is equivalent, in terms of loads, to:

the loads, i.e. lift and the coplanar loads, being applied along the two axes considered above and along the axis about which the drive in rotation takes place, and:

the moments being applied about the axis of rotation of the rotor mast only, which corresponds to the drive torque of the hub, the swivelling capability of this mechanism being therefore only partial, since it offers no freedom of rotation of this mechanism about the mast, the rotor of the invention providing a solution to the disadvantages of state-of-the-art rotors of this type, and such as presented above, by being lighter, simpler, more accessible and therefore more economical to produce and maintain and, more generally, in which the functions of swivelling and driving the hub respectively relative to and by the rotor mast do not necessarily have to be kept separate.

To this end, the invention proposes a rotary-wing aircraft rotor with constant velocity drive for a convertible aircraft with at least one tilting rotor, comprising:

a rotor mast, capable of being driven in rotation about its longitudinal axis, a hub, connected to said mast by a constant velocity drive mechanism and pivoting arrangement, allowing the hub as a whole to pivot about any flapping axis converging with the axis of the mast and perpendicular to said axis of the mast, so that said hub is capable of being driven in constant velocity rotation by said mast, about a geometrical axis of rotation of the hub which may be inclined in any direction about the axis of the mast, and at least two blades, each linked to said hub by a coupling retaining and hingeing its blade in pitch, wherein the constant velocity drive mechanism and coupling arrangement comprises:

a first gimbal, driven in rotation by said mast about said axis of the mast, and mounted so as to pivot about a first diametral axis of the mast, which is substantially perpendicular to said axis of the mast, by two first bearings diametrically opposite relative to said axis of the mast, a second gimbal, also driven in rotation by said mast about said axis of the mast, and mounted so as to pivot about a second diametral axis of said mast, which is substantially perpendicular to said axis of the mast and to said first diametral axis and converging therewith substantially on said axis of the mast, by two second bearings diametrically opposite relative to said axis of the mast, said first gimbal being in addition hinged to said hub by two first ball joint connections, diametrically opposite relative to said axis of the mast, and each centred substantially in a plane defined by said axis of the mast and second diametral axis, said second gimbal being in addition hinged to said hub by two second ball joint connections, diametrically opposite relative to said axis of the mast, and each centred substantially in a plane defined by said axis of the mast and said first diametral axis, so that the blades are driven in rotation by two torque transmission trains each comprising said mast, one respectively of the gimbals, the two corresponding ball joint connections and bearings, and said hub, said torque transmission trains having substantially the same torsional rigidity, and one at least of the components of each torque transmission train having flexibility in deformation about the axis of rotation of the hub.

The rotor according to the invention thus comprises means of driving and articulating the hub by and relative to the mast which are based on a universal joint of which the two successive hinges would be combined at the same location between the driving body, the rotor mast, and the driven body, the hub, in such a way that this device has the advantage of simultaneously performing the two functions of swivelling and torque transmission by means of a small number of parts, which makes it relevant in terms of weight, cost and maintenance.

Moreover, in order that these means should be compatible kinematically, it is necessary for the two gimbals to be able to perform small relative angular deflections about this geometrical axis of rotation of the hub. In fact, where the hub is tilted relative to the mast and about an axis not converging with the pivot axes of the gimbals, pivoting of the gimbals in the absence of flexibility between the two torques transmission trains causes rotation of the gimbals in opposite directions about the drive axis of the rotor. Pivoting of one of the gimbals tends to cause the hub to advance, in the direction of rotation of the rotor, whereas pivoting of the other gimbal tends to cause the hub to retreat (rotating in the opposite direction to the direction of rotation of the rotor). To escape from this hyperstatic state, an additional degree of freedom is introduced along the drive axis, and this is obtained by arranging for one at least of the components of each torque transmission train to have flexibility in deformation about the axis of rotation of the hub.

In general, the necessary flexibility about the torque transmission axis may be obtained in the hub, when the latter comprises at least two hub parts made flexible in relative torsion about the axis of rotation of the hub by characteristics of the shape and/or constituent materials of said hub parts, to each of which one respectively of the gimbals is hinged by two corresponding ball joint connections.

Alternately, or in addition, each of the two gimbals may be embodied in a shape and/or of materials providing flexibility in deformation about the axis of rotation of the hub.

At the same time, or alternatively, this flexibility in deformation may be exhibited by the mast, which then comprises two parts made flexible in relative torsion about the axis of the mast, and formed by at least one slot and/or at least one groove and/or one cut-away portion, substantially axial, whether opening to the outside or not, made in the mast, and such that each of the gimbals is pivoted on and driven in rotation by one respectively of said parts of the mast made flexible in torsion.

In all cases, as indicated above, the two torque transmission trains must have substantially the same torsional rigidity, in order for there to be balancing of the dynamic loads at $2\Omega$, where $\Omega$ is the frequency of rotation of the rotor, for the drive mechanism according to the invention to provide true constant velocity drive. However, this torsional rigidity of the torque transmission trains must also be compatible with the static stresses (linked to torque) and dynamic stresses (linked to the movements imposed by the kinematics of the device) along the torque transmission axis.

According to a first advantageous embodiment, the mast comprises at least two torsion tubes, having substantially equal rigidity in torsion, and which are integral with each other in rotation about said axis of the mast at one axial end capable of being driven in rotation, each of the two gimbals being mounted so as to pivot on one respectively of the two torsion tubes about one respectively of the two diametral axes. Thus the flexibility required to allow relative rotation of the two gimbals about the drive axis of the hub is provided by the two tubes working in torsion and with loads applied in opposite directions. The substantially equal torsional rigidity of the two tubes allows the dynamic loads at $2\Omega$ to be balanced, so that effectively constant velocity drive is obtained.

In a preferred embodiment, the two torsion tubes are coaxial, arranged one inside the other, and integral in rotation about the axis of the mast at their ends axially on the same side of said mast axis, the inner tube being integral, at its opposite axial end, with a coaxial sleeve on which the corresponding gimbal is mounted so as to pivot about the corresponding diametral axis. Due to their coaxial arrangement one inside the other, the two torsion tubes are made of different materials having a different modulus of elasticity, as the inertia in torsion of the enclosing tube is very probably greater than the inertia of the enclosed tube, so that the enclosing tube or outer tube must be made of a material with a lower modulus of elasticity than that of the material of the enclosed tube or inner tube, to achieve the torsional flexibility of this inner tube.

According to a second advantageous embodiment, the additional degree of freedom along the drive axis, which corresponds to the flexibility required between the two torque transmission trains, is introduced by producing bearings and/or ball joint connections hingeing the gimbals respectively relative to the mast and onto the hub, and, to this end, different embodiments of flexible bearings and/or flexible ball joint connections are possible.

The bearings may be produced on the basis of cylindrical, conical or spherical laminated elements, or a combination of these different forms, so as to allow hingeing of each gimbal relative to the mast with a certain flexibility along the torque transmission axis.

In particular, the bearings pivoting the gimbals relative to the mast are cylindrical and/or conical laminated bearings substantially coaxial about respectively the first and second diametral axes, and preferably with substantially the same radial rigidity. Moreover, these pivot bearings may comprise spherical laminated elements, in which case the latter are centred substantially on one respectively of the diametral axes mentioned previously, and preferably with substantially the same radial rigidity relative to said diametral axes.

The ball joint connections may also be produced from spherical, cylindrical, conical or parallelepiped-shaped laminated elements, or a combination of these forms, so as to enable each gimbal to be hinged relative to the hub, also with a certain flexibility along the torque transmission axis.

In particular, the ball joint connections of the hinges of the gimbals to the hub comprise ball joints associated with substantially coaxial cylindrical and/or conical laminated bearings, providing radial and axial flexibility relative to the corresponding diametral axis, between two rigid members respectively in the inner and outer radial position, a first of which is attached to the corresponding gimbal, and the second of which is attached to the hub.

Advantageously, these ball joint connections of the hinges of the gimbals to the hub comprise laminated ball joints.

Thus, the pivot bearings of the gimbals and the ball joint connections of the gimbals to the hub have sufficient flexibility to allow the gimbals to pivot without excessive strain. In addition, the use of laminated pivot bearings with substantially the same radial rigidity provides balancing of dynamic loads at 2Ω, which, as explained above, corresponds to a constant velocity drive.

In a practical manner, the first and second gimbals are driven in rotation about said axis of the mast by respectively the first and a second drive arm, integral in rotation with said mast, and the axes of which are respectively the first and second diametral axes of said mast.

There are thus produced on the mast two drive arms offset by 90° and both perpendicular to the axis of the mast, the gimbals being mounted on these so as to pivot and also hinged to the hub by the ball joint connections.

According to an advantageously simple structure, each of the drive arms comprises two end fittings which are axisymmetric about the corresponding diametral axis, diametrically opposite and projecting radially outwardly from said mast, and each retained in one respectively of the two bearings pivoting the corresponding gimbal relative to said mast.

In the variant embodiment, in which the flexibility between the two torque transmission trains is provided by the two torsion tubes mentioned above, the two end fittings of each drive arm advantageously project radially outwardly and are integral with one respectively of the two torsion tubes.

On the other hand, when this flexibility between the two torque transmission trains is provided in the bearings and/or ball joint connections, the two end fittings of each drive arm project radially outwardly and are integral with a central drive barrel fitted around the mast and integral in rotation with the latter about its axis.

In order that the hub may be advantageously rigid in its plane, and that all of the constant velocity drive mechanism and pivoting arrangement is suitably protected, the second member of each combined hinge with ball joint and laminated bearing is advantageously attached to a hub casing which surrounds the two gimbals, their pivot bearings and hinges, and is attached to a hub plate connected to the blades and having a central opening through which said mast runs. The hub plate may then be a plate of known type, of composite material, and in the form of a star with outward-extending arms equal in number to the number of the blades and on each of which are mounted the means for retaining and hingeing a blade in pitch, this arrangement providing good rigidity in drag and a certain flexibility along the flapping axis.

In a preferred embodiment, each laminated bearing for pivoting a gimbal is a conical bearing converging radially outwardly, an outer radial member of which is annular and attached in a cut-away portion of corresponding shape on the corresponding gimbal, and an inner radial member of which is tubular and integral with an end fitting for being driven by said mast.

To improve the rigidity of the rotor in cyclic flapping, the hub may also and advantageously be connected to the mast by at least one elastic assembly for returning the hub to a rest position substantially perpendicular to the axis of the mast.

In a manner known in itself, this elastic return assembly may advantageously comprise at least one half of a central laminated spherical thrust bearing, an outer member of which is connected to the hub and an inner member of which is integral in rotation with the mast. This half of a spherical thrust bearing may be fitted under the hub plate, itself attached below the hub casing enclosing the constant velocity drive mechanism and the pivoting means, but, if in addition the elastic return assembly also comprises an upper half of a central laminated spherical thrust bearing, which covers and encloses said hub casing, a central laminated spherical thrust bearing is then obtained which assists in transmitting to the rotor mast the lift and coplanar loads applied to the rotor.

BRIEF DESCRIPTION OF THE DRAWINGS

Other characteristics and advantages of the invention will emerge from the description given below of examples, though not limited to these, of embodiments described with reference to the appended drawings in which.

DETAILED DESCRIPTION OF SPECIFIC EMBODIMENTS

Figure 2:
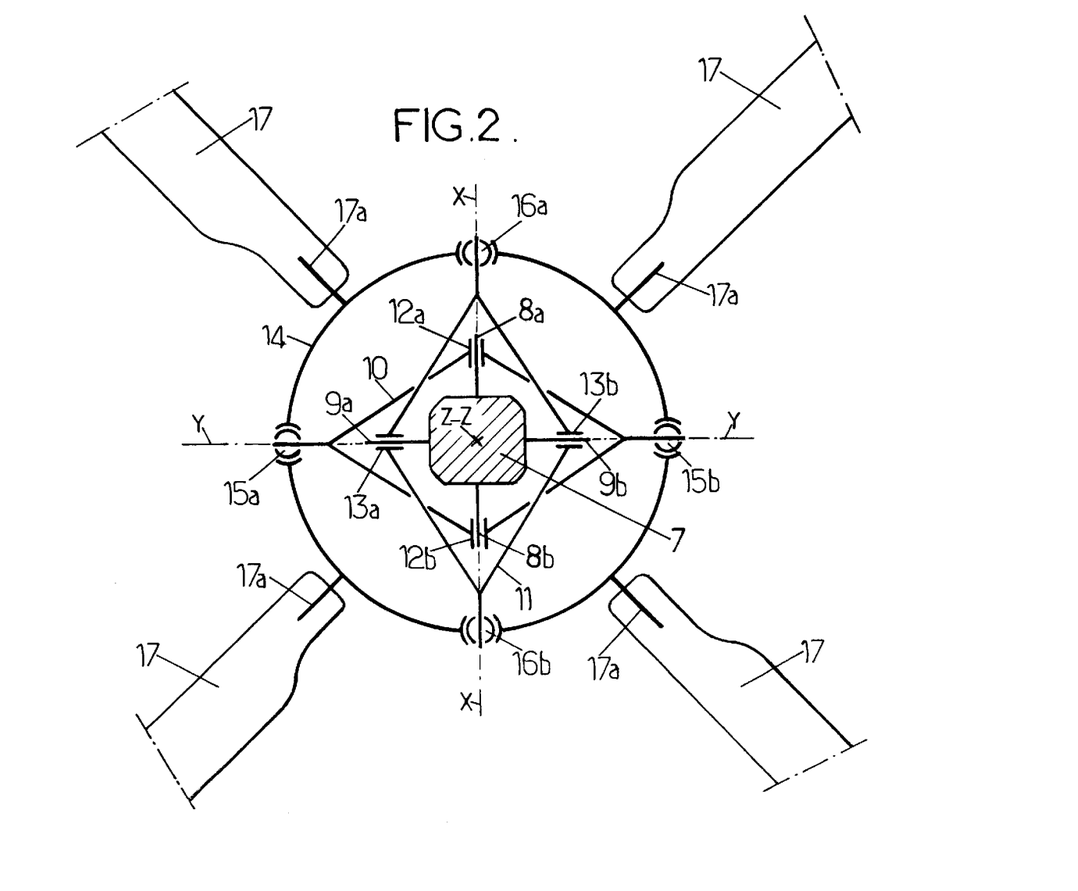
FIG. 2 is a schematic view in plan of a four-bladed rotor with constant velocity drive according to the invention.

FIG. 2 shows schematically in plan a four-bladed rotor with constant velocity drive according to the invention for equipping the tilting rotors of the convertible aircraft described above with reference to FIG. 1.

In FIG. 2, this four-bladed rotor comprises a rotor mast 7, driven at its base in rotation about its longitudinal axis Z-Z, and the end part of which, at the end opposite the base (not shown) provides cantilever support for two drive end fittings 8a and 8b, diametrically opposite relative to the axis Z-Z and projecting radially towards the outside of the mast 7, perpendicularly to the axis Z-Z, and coaxial about a first diametral axis X-X of the mast 7, so that the end fittings 8a and 8b constitute a first diametral drive arm, integral in rotation with the mast 7. Similarly, the mast 7 supports two other drive end fittings 9a and 9b, also diametrically opposite relative to the axis Z-Z and perpendicular to the latter, cantilevered and projecting radially towards the outside of the mast 7, and coaxial about a second diametral axis Y-Y of the shaft 7 which is perpendicular to the first diametral axis X-X and converging with the latter on the axis Z-Z. The two end fittings 9a and 9b thus produce a second diametral drive arm, integral in rotation with the mast 7, and perpendicular to the first diametral drive arm 8a–8b.

A first gimbal 10, substantially lozenge-shaped in FIG. 2, is mounted so as to pivot about the first diametral axis X-X by two first bearings 12a, 12b, shown in the form of plain or preferably laminated cylindrical bearings mounted so as to swivel on the drive end fittings respectively 8a and 8b, while a second gimbal 11, also substantially lozenge-shaped, and aligned perpendicular to the first gimbal 10, is mounted so as to pivot, in a similar manner, by two second bearings 13a and 13b, of the same type as bearings 12a and 12b, on the drive end fittings respectively 9a and 9b, so that the second gimbal 11 is able to pivot relative to the mast 7 about the second diametral axis Y-Y.

The two gimbals 10 and 11 are thus driven in rotation by the mast 7, about the axis Z-Z of the mast 7, while being mounted so as to pivot each about one respectively of two diametral axes X-X, Y-Y perpendicular to each other and secant, which are the axes of the two arms for driving in rotation.

In addition, the first gimbal 10 is hinged on a hub casing or body 14, shown as annular in shape in FIG. 2, by two first ball joint connections, preferably comprising laminates, 15a and 15b, which are diametrically opposite relative to the axis Z-Z of the mast 7, and each centred on the second diametral axis Y-Y, in the neutral or rest position of the rotor, the two first ball joint connections 15a, 15b remaining centred substantially in a diametral plane, defined by the axis Z-Z and by the second diametral axis Y-Y, when the first gimbal 10 is pivoted about the first diametral axis X-X.

Similarly, the second gimbal 11 is hinged to the hub body 14 by two second ball joint connections, also preferably comprising laminated ball joints, 16a, 16b, diametrically opposite relative to the axis Z-Z and each centred, at rest or in the neutral position of the rotor, on the first diametral axis X-X, these second ball joint connections 16a, 16b remaining substantially centred in a diametral plane defined by the axis Z-Z and the first diametral axis X-X when the second gimbal 11 is pivoted about the second diametral axis Y-Y.

The hub body 14 supports, radially towards the outside relative to the mast 7, four blades 17, each of which is connected to the hub 14 by means, shown schematically as 17a, retaining the corresponding blade 17 and hingeing this blade in pitch about its longitudinal axis.

In this rotor, the hub 14 is connected to the mast 7 by the two crossing gimbals 10 and 11, hinged to the inside of the hub 14 by laminated ball joint connections 15a, 15b and 16a, 16b, and hinged to pivot about the two perpendicular drive arms 8a–8b and 9a–9b, by bearings 12a, 12b and 13a, 13b, according to an arrangement which at the same time constitutes a mechanism for pivoting the hub 14 and the blades 17, allowing the hub 14 as a whole to pivot about any flapping axis intersecting the axis Z-Z of the mast 7 and aligned in any direction around the axis Z-Z, and a mechanism for a constant velocity drive of the hub 14 and of the blades 17 about a geometrical axis of rotation of the hub 14, which may be inclined in any direction about the axis Z-Z of the mast 7 by controlling the pivoting of the gimbals 10 and 11 about their respective diametral axes X-X and Y-Y. Torque is transmitted between the mast 7 and the hub 14 by two transmission trains each comprising the mast 7, one respectively of the gimbals 10 and 11, the corresponding two bearings 12a, 12b or 13a, 13b, the corresponding two ball joint connections 15a, 15b or 16a, 16b and the hub 14, these two torque transmission trains having substantially the same rigidity in torsion about the axis of rotation of the hub 14, in order for constant velocity transmission to be obtained, because of the balancing of the dynamic loads at 2Ω.

The flexibility required so that this mechanism is not hyperstatic is provided by the flexibility of the laminated bearings 12a, 12b and 13a, 13b pivoting the gimbals 10, 11 and/or of the laminated spherical joints 15a, 15b and 16a, 16b connecting the gimbals 10 and 11 to the hub 14, so that the pivoting movements of the gimbals 10 and 11 are permitted without excessive strain, and by permitting a small relative angular deflection of the two gimbals 10 and 11 about the drive axis.

The laminated bearings 12a, 12b and 13a, 13b may be produced from cylindrical, truncated cone-shaped or even spherical laminated elements, or again constituted of combinations of laminated elements of these different types, so as to allow pivoting hinge movements of the gimbals 10 and 11 relative to the mast 7 with a certain flexibility along the torque transmission axis.

The ball joint connections 15a, 15b and 16a, 16b are spherical and laminated hinges comprising laminated ball joints, or normal ball joints associated with laminated elements of the cylindrical or truncated cone type, or again with a combination of laminated elements of these different types, so as to allow hingeing of the gimbals 10 and 11 to the hub 14 also with a certain flexibility along the torque transmission axis. To this end, the ball joint connections are advantageously produced with laminated ball joints associated with cylindrical and/or truncated cone-shaped laminated bearings.

When the device with two gimbals 10 and 11 is not enclosed by halves of a spherical flapping thrust bearing, the laminated bearings 12a, 12b and 13a, 13b and/or the laminated ball joint connections 15a, 15b and 16a, 16b must be capable not only of providing the required flexibility along the torque transmission axis but also of transmitting the loads coming from the rotor (lift and coplanar loads) and, to this end, at least these laminated bearings, providing the connection between the gimbals 10 and 11 and the mast 7, or at least these laminated ball joint connections, providing the connection between the gimbals 10 and 11 and the hub 14, or preferably these laminated bearings and laminated ball joint connections must be capable of transmitting an axial load, relative to the corresponding diametral axis X-X or Y-Y, which is simultaneously an axis of revolution of the laminated elements constituting these bearings and ball joint connections, which may be provided, in a simple manner, by using truncated cone-shaped laminated elements to produce the laminated bearings 12a, 12b and 13a, 13b and/or the ball joint connections 15a, 15b and 16a, 16b.

On the other hand, where there is a spherical flapping thrust bearing enclosing the arrangement of gimbals 10 and 11, for dynamic reasons in particular, and allowing an increase in rigidity in flapping and contributing to transmission of the lift and coplanar loads from the hub 14 to the mast 7, so that the coplanar load does not necessarily have to be taken by the laminated elements of the bearings 12a, 12b and 13a, 13b and of the ball joint connections 15a, 15b and 16a, 16b, it is not necessary for these bearings and ball joint connections to comprise truncated cone-shaped laminated elements, or any other laminated element capable of transmitting an axial load.

As a variant, and alternatively or at the same time, the flexibility required along the torque transmission axis and between the two torque transmission trains may be provided by the mast 7, and/or the gimbals 10 and 11, and/or the hub 14.

For example, the hub 14 may comprise at least two parts flexible in relative torsion about the geometrical drive axis of the hub 14, or torque transmission axis, one of these two parts supporting the two ball joint connections 15a and 15b, while the other supports the other two ball joint connections 16a and 16b, and these two parts may be delimited on the hub 14 by geometrical means, such as grooves and/or slots opening where appropriate into an axial end of the tubular hub body 14, and/or by ribs associated with grooves or slots, or again by a particular geometrical shape given to these parts of the hub 14, on which these two flexible parts may where appropriate be produced by introducing materials having locally different mechanical and/or physical characteristics.

If some of the required flexibility is obtained on the two gimbals 10 and 11, this flexibility must be obtained to the same degree on each of the gimbals 10 and 11, which may be achieved with a shape and/or materials providing this flexibility of each gimbal in deformation about the axis of rotation of the hub, by an elastically deformable design of at least part of each gimbal 10 and 11.

On the mast 7 some of the required flexibility may be obtained by delimiting, on the end of the mast 7 which supports the drive arms 8a–8b and 9a–9b, two mast parts flexible in relative torsion about the axis Z-Z of the mast 7. These two parts flexible in torsion may be delimited by substantially axial grooves or slots made in the mast 7, so as to delimit on the latter two pairs of diametrically opposite zones, of which each pair of zones supports one respectively of the two pairs of drive end fittings 8a, 8b and 9a, 9b. These zones may also be separated from each other by cut-away portions made in the mast 7 which, as with the grooves and/or slots also made in this mast, may or may not be open at the end of the mast 7 at the end opposite to its base, by which it is driven in rotation.

A first example of embodiment of a three-bladed rotor, the hub of which is connected to the rotor mast by such a mechanism providing constant velocity drive and overall pivoting of the hub about any flapping axis passing through the axis of the mast, is now described with reference to FIGS. 3 to 5.

Figure 3:
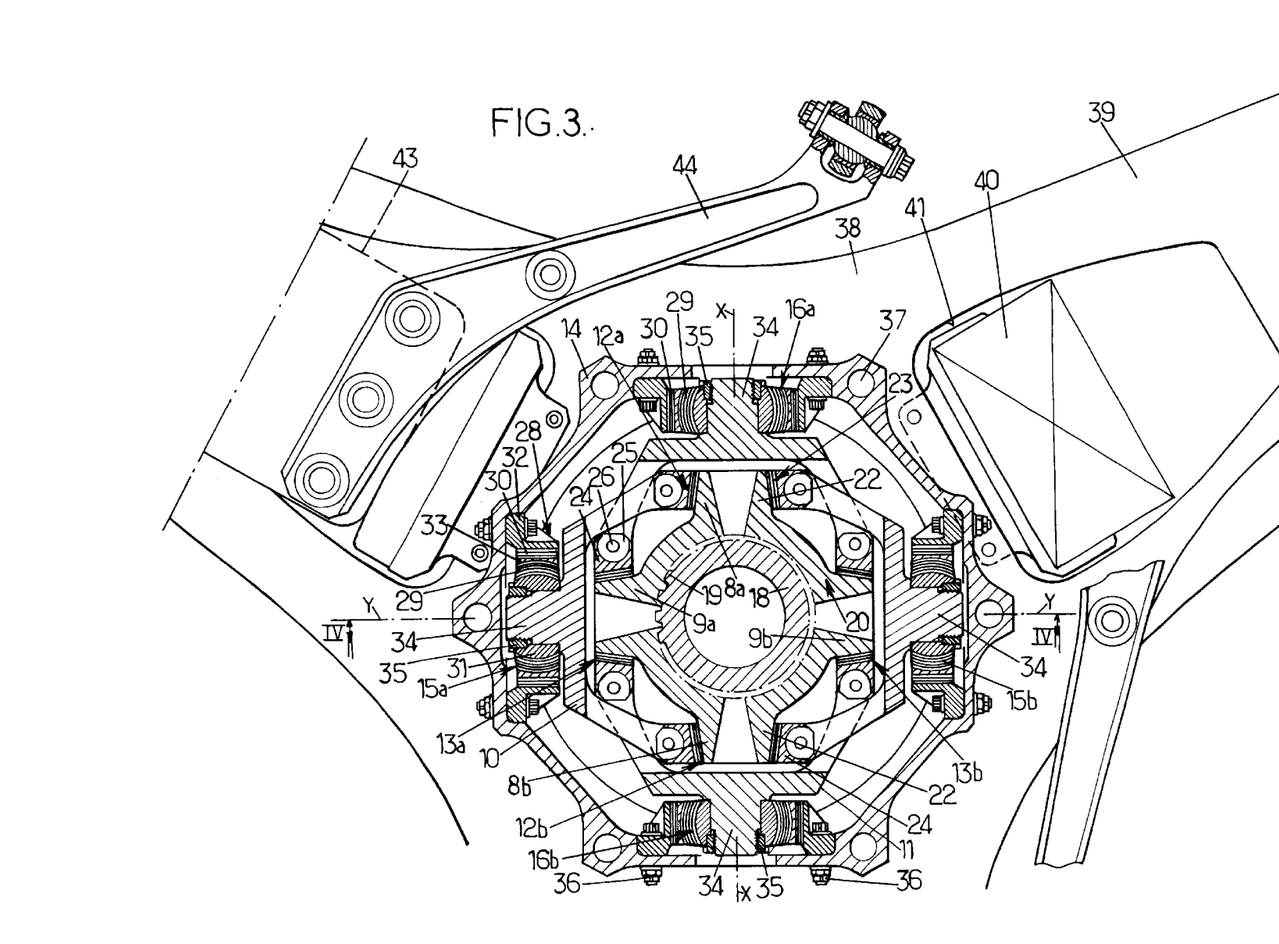
FIG. 3 is a schematic view partly in plan and partly in section of a three-bladed rotor with constant velocity drive according to the invention.
Figure 4:
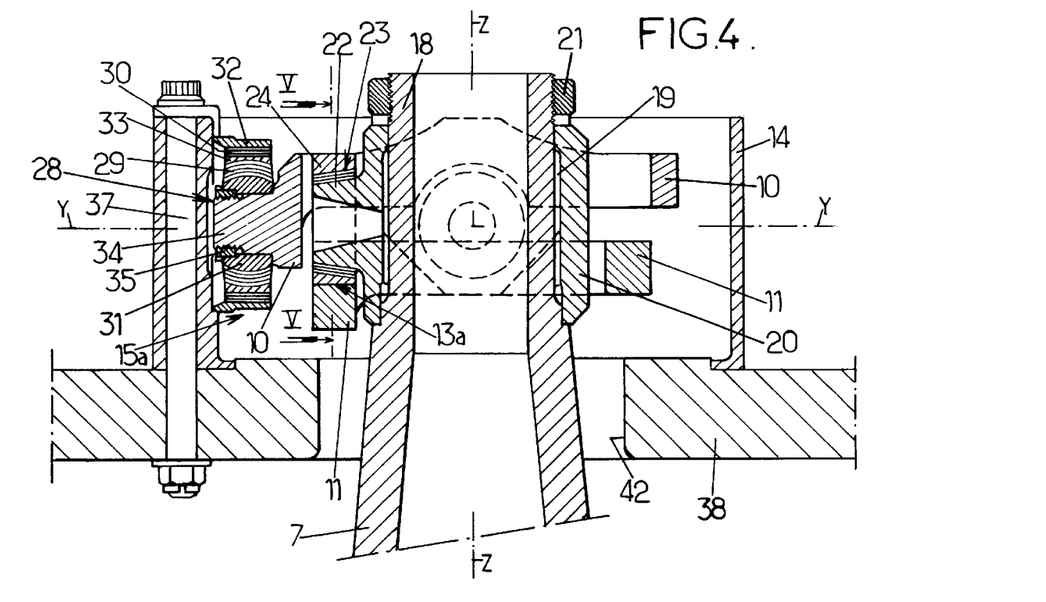
FIG. 4 is a view in section along IV—IV in FIG. 3.
Figure 5:
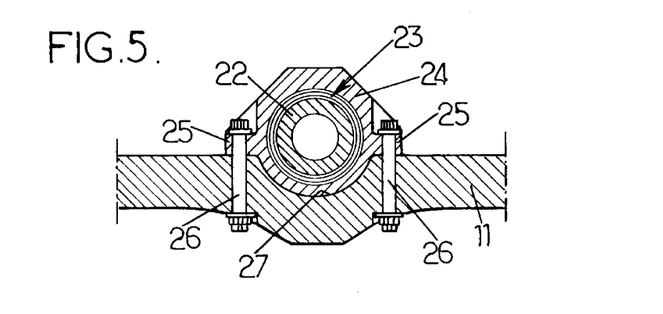
FIG. 5 is a view in section along V—V in FIG. 4.

On the three-bladed rotor in FIGS. 3 to 5, the mast 7 is a tubular mast, the cylindrical/tapered end of which, connected to the hub, comprises a splined cylindrical portion 18 the external axial splines 19 of which are engaged with internal axial splines of a drive barrel 20 mounted on the splined portion 18 of the mast 7 so as to be integral in rotation with the mast 7 about the axis Z-Z, and retained in an axial position on the mast 7 by a securing nut 21, screwed onto the threaded upper end of the portion of mast 18. Four stub arms 22, tubular and externally truncated cone-shaped, projecting radially towards the outside of the barrel 20 and coaxial and axisymmetric in pairs about one respectively of the two perpendicular diametral axes, constitute the two drive end fittings 8a and 8b of a first diametral drive arm and the two drive end fittings 9a and 9b of the second diametral drive arm which are connected in rotation to the mast 7 by the barrel 20. These four truncated cone-shaped stub arms 22 constitute at the same time the inner radial members of the four laminated bearings 23, in this example of truncated cone shape and converging towards the outside, which constitute the two first bearings 12a, 12b and the two second bearings 13a, 13b for pivoting the two gimbals 10 and 11 about their respective diametral axis X-X, Y-Y. The laminated bearings 23 all have substantially the same radial rigidity. Each of them comprises an outer radial member 24 which is annular with, as shown in FIG. 5, two lugs 25 projecting radially towards the outside, by which the laminated bearing 23 is bolted by the screws 26 to the corresponding gimbal 10 or 11, which has two half-cylindrical cut-away portions 27 forming cradles each housing a portion of corresponding shape of the outer radial member 24 of one respectively of the two bearings 23 mounted on this gimbal 10 or 11.

It should be noted that the assembly of the outer members 24 of the bearings 23 is reversed, in a vertical direction in FIGS. 3 to 5, on one of the gimbals 10 and 11 relative to the other, since the two gimbals 10 and 11 are offset axially along the axis Z-Z, the gimbal 10 being arranged above the gimbal 11, the structure of these gimbals 10 and 11 and also the assembly of the laminated bearings 23 and of the ball joint connections now described being such that the axes of the bearings and of the ball joint connections remain convergent at the same point on the axis Z-Z.

The first and second laminated ball joint connections 15a, 15b and 16a, 16b which hinge the gimbals 10 and 11 to the hub casing 14 are identical with each other and each produced in the form of a combined hinge 28 with a laminated ball joint 29 associated with a cylindrical laminated bearing 30, so that the combined hinge 28 has radial and axial flexibility relative to the corresponding diametral axis X-X or Y-Y. For each combined hinge 28, the laminated ball joint 29 and the cylindrical laminated bearing 30 are arranged radially in series or one around the other, between an inner radial member 31 and an outer radial member 32, one of which is attached to the corresponding gimbal 10 or 11 and the other is attached to the hub casing 14.

In the example in FIGS. 3 to 5, for each combined hinge 28, the laminated ball joint 29 is inside the corresponding cylindrical laminated bearing 30, with an intermediate radial member 33 placed between them, and the inner radial member 31, which is that of the laminated ball joint 29, is retained around one respectively of two drive pins 34, diametrically opposite and projecting radially towards the outside on the corresponding gimbal 10 or 11, by means of a nut 35 screwed around the threaded outer radial end of this cylindrical drive pin 34. The outer member 32 which, in this example, is the outer member of the cylindrical laminated bearing 30, is attached by two bolts 36 against the inner wall of the hub casing 14 which, in this example, is of annular form with a substantially octagonal cross-section (see FIG. 3) with increased thickness at the vertices drilled with axial bores to take the screws 37 attaching the hub casing to a hub plate 38.

The mechanism for a constant velocity drive and pivoting of the hub 14-38 relative to the mast 7 is thus housed and protected inside the hub casing 14, while the hub plate 38, thus suspended and hinged to the mast 7, and driven in rotation by the latter, may be connected to the blades of the three-bladed rotor in this example.

The hub plate 38 is, for example, a plate produced from composite material and in the form of a star comprising the same number of arms 39 extending outwards as the rotor has blades, three in this example, so that each blade is retained and hinged in pitch to the corresponding arm 39 by appropriate means, indicated partially and schematically by the number 40 in FIG. 3. These means 40 are mounted on the one hand at the outer radial end (not shown) of each arm 39 and, on the other hand, in a recess 41 made in the part of the arm 39 adjacent to the central part of the hub plate 38, which central part has a central opening 42 through which the rotor mast 7 runs.

In a known manner, the retaining and hingeing means 40 in the cavity 41 and the additional retaining and hingeing means 40 at the outer end of the arm 39 are connected by a cuff 43 rigid in torsion, integral with the root of the blade and produced, for example, by two plates one vertically above the other and lined up radially so as to straddle the corresponding hub arm 39. The inner radial end of this cuff 43 is integral with a pitch change lever 44 for controlling the pitch of the corresponding blade.

It should be noted that such a hub plate 38 with arms 39 extending outwards has both high rigidity in drag and appropriate flexibility in flapping, while permitting a favourable arrangement of the pitch change lever 44, the end yoke of which, for connection to a pitch control rod, is outside the hub plate 38, between two arms 39, and such that pitch-flapping coupling of a small negative value can be obtained, which is particularly favourable for the tilting rotors of convertible aircraft, for which a small flapping moment is also desirable, which is in fact obtained with the rotor previously described, the flapping eccentricity of which is nil, due to the fact that the flapping axes of the blades intersect the axis of the rotor mast because of the pivoting of the rotor as a whole by its hub about a point on this axis.

Figure 12:
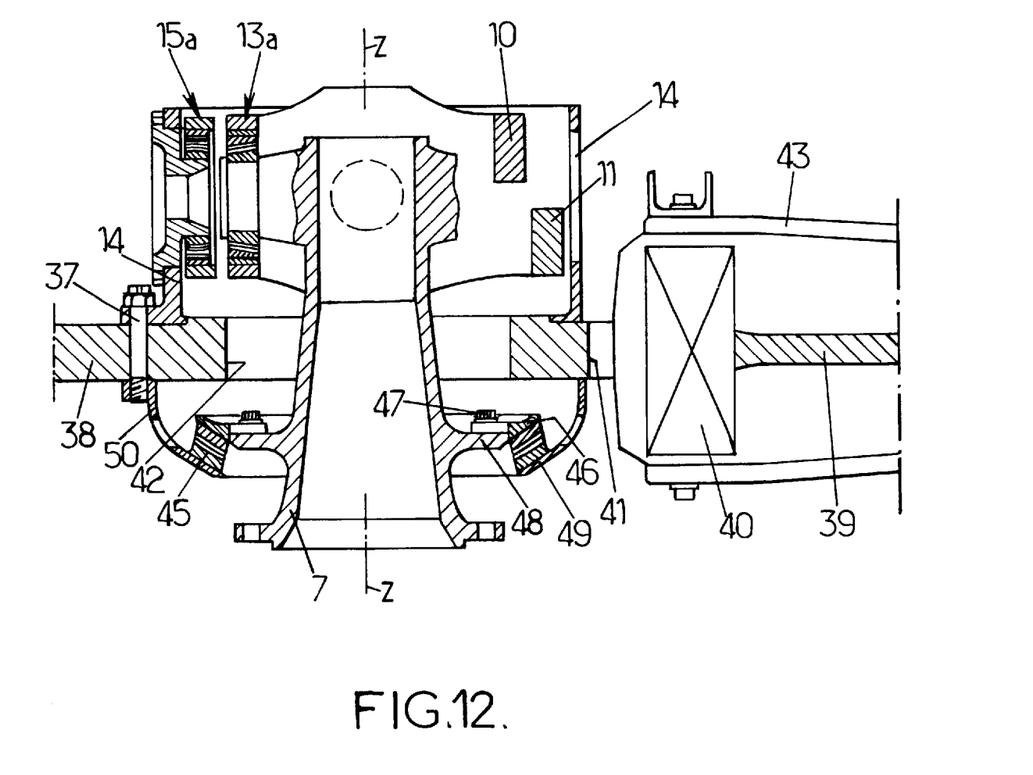
FIG. 12 is a partial view, partly in axial section and partly in side elevation, of the example of a rotor in FIGS. 4 to 6 equipped in addition with half of a central spherical laminated thrust bearing for the suspension of the hub.

As a variant, as shown in FIG. 12, in order to take advantage of greater rigidity in cyclic flapping, the hub 14-38 is also connected to the mast 7 by at least one half of a central laminated spherical thrust bearing 45, which constitutes an elastic means for returning the hub 14-38 to the neutral or rest position relative to the axis Z-Z of the mast 7, i.e. substantially perpendicular to this axis Z-Z. As shown in FIG. 12, this half of a laminated spherical thrust bearing 45, arranged below the hub plate 38, is connected to the mast 7 by an inner rigid member 46, bolted at 47 to an outer radial flange 48 of the mast 7, while the outer rigid member 49 of the half of a spherical laminated thrust bearing 45 is extended towards the hub plate 38 by a dome 50 equipped with lugs by which this dome 50 is secured against the lower face of the hub plate 38 by the screws 37 which attach the hub casing 14 to the latter.

Substantially symmetrically relative to the hub plate 38 and substantially above and around the hub casing 14, another half of a spherical laminated thrust bearing (not shown in FIG. 12) may be attached to the hub by its outer member and to the mast 7 by its inner member, being centred, as is the lower half of a spherical laminated thrust bearing 45, on the intersection of the diametral axes X-X and Y-Y and of the axis Z-Z, so that these two halves of a spherical laminated thrust bearing contribute in addition to transmitting to the mast 7 the lift and the coplanar loads which are developed in the rotor.

As a variant, the mast 7 may be made integral in rotation with the inner member 46 of the or each spherical half of a laminated thrust bearing by axial splines, or by any other equivalent means.

The second example of a three-bladed rotor with constant velocity drive in FIGS. 6 to 11 differs mainly from that in FIGS. 3 to 5 by the fact that the flexibility provided, in the example in FIGS. 3 to 5, by the radial and axial flexibility of the laminated bearings and laminated ball joints, in order to permit a small relative angular deflection of the two gimbals 10 and 11, is provided by two coaxial torsion tubes arranged one inside the other, made integral in rotation by a base linked to a drive shaft, and such that each respectively of the two gimbals is mounted so as to pivot about one respectively of the two diametral axes X-X and Y-Y on one respectively of the two torsion tubes.

Figure 6:
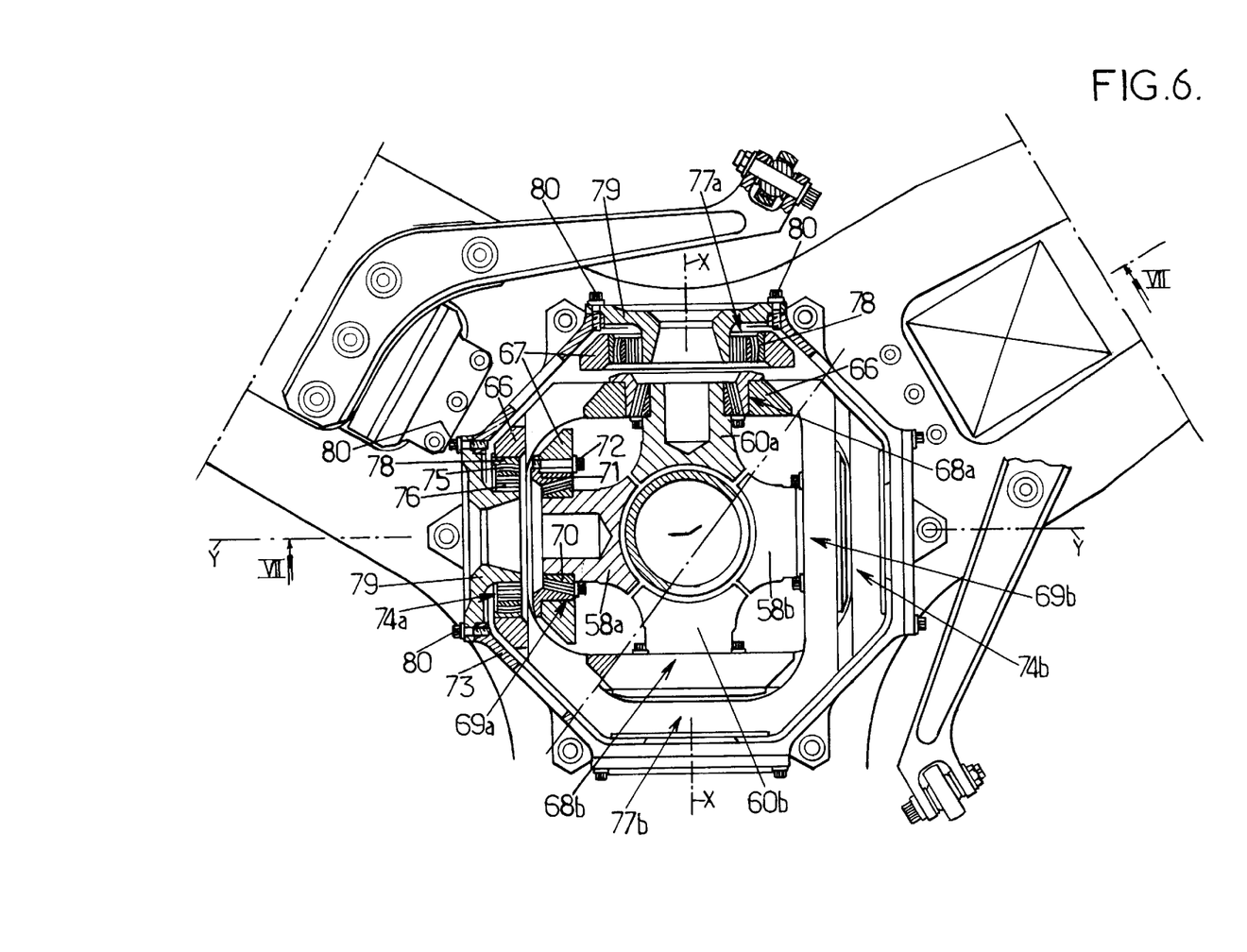
FIG. 6 is a view similar to FIG. 3 for a second example of a three-bladed rotor with constant velocity drive, with two torsion tubes.
Figure 7:
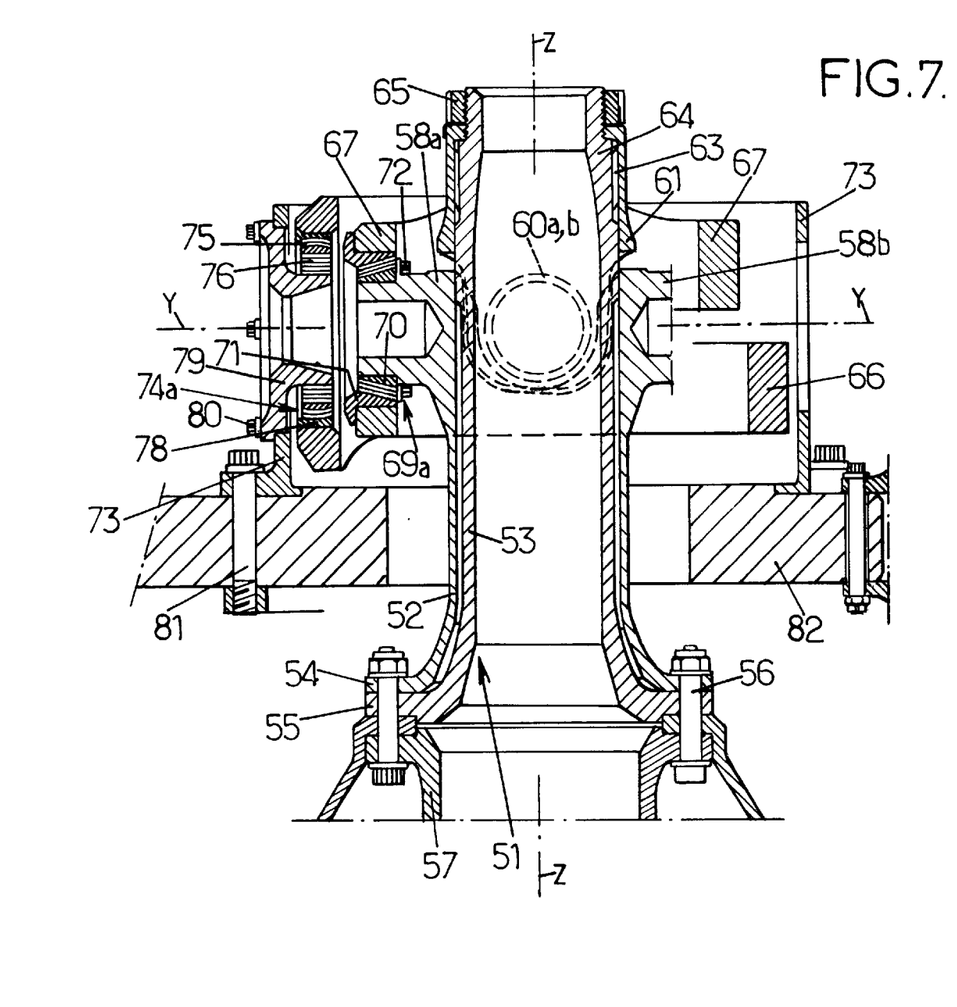
FIG. 7 is a view in axial section along VII—VII in FIG. 6, FIGS. 8, 9, 10 and 11 are schematic views in axial section along perpendicular planes and a schematic view in plan and partly in section of one of the torsion tubes with, in FIG. 10, a drive arm end fitting support sleeve made integral with the other torsion tube in FIG. 7.

In FIGS. 6 and 7, the rotor mast 51, or the part of the latter which drives the hub in rotation, comprises two torsion tubes 52 and 53, coaxial about the axis Z-Z of rotation of the mast 51 and arranged one 53 inside the other 52, these two tubes 52 and 53 comprising, at their base, external radial flanges 54 and 55 by which the bases of the tubes 52 and 53 are made integral in rotation about the axis Z-Z by a ring of bolts 56 at the same time attaching the tubes 52 and 53 by their flanges 54 and 55 to a drive shaft 57.

Figure 8:
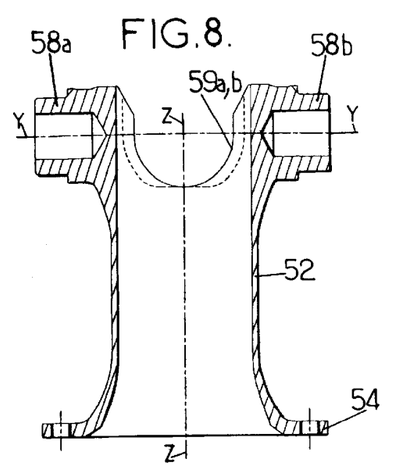
Figure 9:
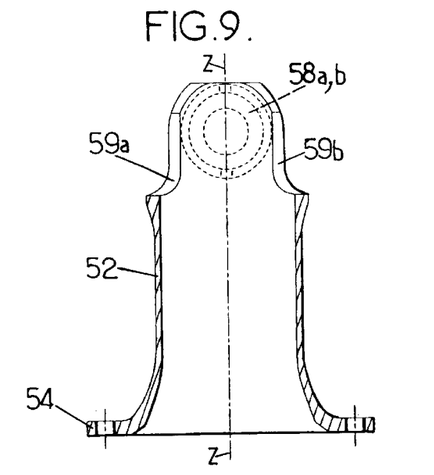
Figure 10:
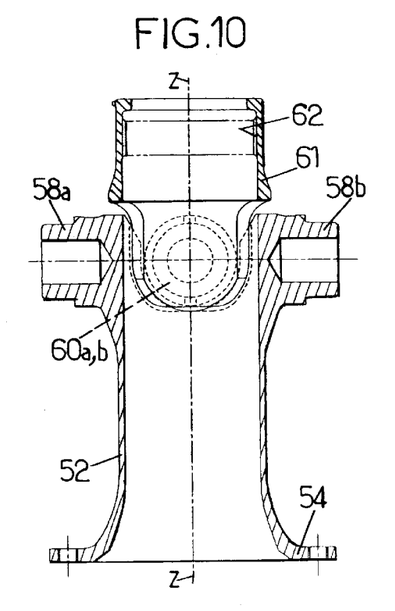
Figure 11:
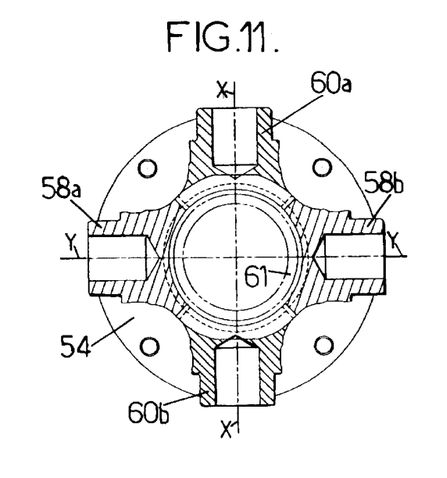

The outer torsion tube 52 is shown in FIGS. 8 and 9 in axial section through two planes perpendicular to each other, and this tube 52 supports at its axial end opposite the flange 54, two drive end fittings 58a and 58b, cylindrical, hollowed out, coaxial and axisymmetric about one, for example Y-Y, of the two perpendicular diametral axes of the mast 51, and diametrically opposite projecting radially towards the outside, and in one piece with the tube 52, so that the end fittings 58a and 58b constitute a first diametral drive arm of the mast 51. The outer tube 52 also has, between these end fittings 58a and 58b, two cut-away portions 59a and 59b, substantially semi-circular, through which run the other two drive end fittings 60a and 60b, similar to the end fittings 58a and 58b in that they are cylindrical of circular cross-section, diametrically opposite, coaxial, and axisymmetric about a second diametral axis, for example X-X, of the mast 51. These two end fittings 60a and 60b constitute the second diametral drive arm of the device, and are diametrically opposite projecting radially towards the outside, and in one piece with the base of a sleeve 61, comprising internal axial splines 62 which engage with external axial splines 63 of the axial end part 64 of the inner tube 53, at the end opposite its base 55, and on which the sleeve 61 is axially engaged and secured, thus being integral in rotation with this part 64 of the inner tube 53 about the axis Z-Z, by a nut 65 screwed onto the threaded end of this part 64.

As in the example in FIGS. 3 to 5, a first gimbal 66 is mounted so as to pivot about the diametral axis X-X defined by the drive end fittings 60a and 60b of the sleeve 61 on the inner torsion tube 53, by two truncated cone-shaped laminated bearings 68a and 68b, and in a similar manner, a second gimbal 67 is mounted so as to pivot about the other diametral axis Y-Y, defined by the drive end fittings 58a and 58b of the outer torsion tube 52, by two other truncated cone-shaped laminated bearings 69a and 69b.

These truncated cone-shaped laminated bearings 68a, 68b and 69a, 69b are identical to each other, have the same radial rigidity, and each comprise an inner annular member 70, fitted around the corresponding end fitting 58a, 58b or 60a, 60b, and their outer annular member 71 is engaged in a corresponding coaxial cylindrical bore in the corresponding gimbal 66 or 67 to which this outer member 71 is attached by screws 72.

Moreover, the gimbal 66 is at the same time hinged to a hub casing 73, and inside the latter, by two combined hinges 74a and 74b with laminated ball joint 75 and cylindrical laminated bearing 76, at two diametrically opposite ends of this gimbal 66 relative to its diametral axis X-X of pivoting defined on the inner torsion tube 53, and in a similar manner, the other gimbal 67 is also hinged on and inside the hub casing 73 by two combined hinges 77a and 77b identical to the hinges 74a and 74b, i.e. with a laminated ball joint 75 and cylindrical laminated bearing 76. As in the previous example, the laminated ball joints 75 of the two combined hinges of each gimbal 66 or 67 are substantially centred, at rest, on the diametral axis of pivoting of the other gimbal 67 or 66, or, when one or other of the gimbals 66 and 67 has pivoted, these laminated ball joints 75 are centred substantially in the diametral plane passing through the axis Z-Z of the mast 51 and through the diametral pivot axis of the other gimbal. However, when at least one of the gimbals 66 and 67 is pivoted, the small relative angular deflection of the two gimbals 66 and 67 about their common drive axis is permitted not only because of the axial and radial flexibility of the truncated cone-shaped laminated bearings 68a, 68b and 69a, 69b and also of the combined hinges 74a, 74b and 77a, 77b, but also because of the flexibility in torsion of the two torsion tubes 52 and 53, which are made so as to have substantially the same rigidity in torsion. For this reason, the two torsion tubes 52 and 53 are made from different materials, having a different modulus of elasticity, for example the outer tube 52 is of titanium and the inner tube 53 of steel to compensate for the fact that the inertia of the outer tube 52 in torsion is greater than the inertia of the inner tube 53 in torsion. The modulus of elasticity of the outer tube 52 is therefore smaller so that the flexibility in torsion of this outer shaft 52 is substantially equal to that of the inner tube 53. Thus the necessary flexibility between the two torque transmission trains can be provided mainly by the torsion tubes 52 and 53, on each of which one respectively of the two gimbals 66 at 67 is hinged so that it can pivot, which simplifies the design of the laminated bearings 68a, 68b and 69a, 69b and of the laminated ball joint connections 74a, 74b and 77a, 77b.

A difference compared with the previous example lies in the assembly of the combined hinges with laminated ball joint 75 and cylindrical laminated bearing 76, in so far as the ball joint 75 radially surrounds the cylindrical laminated bearing 76, between two annular members, one of which, 78, in the outer radial position, is engaged in a coaxial cylindrical bore in the corresponding gimbal 66 or 67, while the other member 79, in the inner radial position, is extended axially and then radially towards the outside, into an opening in the hub casing 73 to which this member 79 is attached by screws 80.

Moreover, and as in the previous example, the hub casing 73 is attached by screws 81 to the upper face of a hub plate 82, similar to the hub plate 38 in FIGS. 3 and 4, i.e. preferably of composite material and in the form of a star with as many outward-extending arms as the rotor has blades, each blade being retained and hinged in pitch to the hub plate 82 on one of its arms, and, finally, the hub plate 82 may also, as shown in FIG. 12, be in addition connected to the mast 51, and in particular to the base 54-55 of this mast 51, by an elastic device returning the hub to a neutral position relative to the mast, i.e. such that the hub plate 82 is substantially perpendicular to the axis Z-Z of the mast 51, by at least one half of a central laminated spherical thrust bearing, such as the half of a thrust bearing 45 in FIG. 12, an inner member of which is made integral in rotation with the mast 51, while its outer member is made integral in rotation with the hub plate 82.

In the example in FIGS. 6 to 11 also, the hub casing 73 encloses and supports a mechanism for both constant velocity drive and pivoting of the hub as a whole relative to the rotor mast 51, on which this mechanism is also supported.

By comparison with the embodiments of the state of the art, this mechanism providing pivoting as a whole and a constant velocity drive mechanism replaces both the central flapping stop and the constant velocity drive device, for example of the type using rods.

In the rotor according to the invention, the arrangement of the different components of this mechanism makes maintenance simpler, as accessibility to these components is greatly improved and, moreover, although the number of laminated bearings or ball joints remains the same as those of the laminated components in similar embodiments of the state of the art, the definition of the laminated components of the rotor according to the invention is simpler, which results in a saving in weight and cost.

The invention has now been described in detail for the purposes of clarity of understanding. It will, however, be appreciated that certain changes and modifications may be practised within the scope of the appended claims.

What is claimed is:

1. A rotary-wing aircraft rotor with constant velocity drive in particular for a convertible aircraft with at least one tilting rotor, comprising:

a rotor mast, capable of being driven in rotation about its longitudinal axis, a hub connected to said mast by a constant velocity drive mechanism and pivoting arrangement, allowing pivoting of the hub as a whole about any flapping axis converging with the axis of the mast and perpendicular to said axis of the mast, in such a way that said hub is capable of being driven in constant velocity rotation by said mast, about a geometrical axis of rotation of the hub which may be inclined in any direction about the axis of the mast, and at least two blades, each linked to said hub by a coupling retaining and hingeing its blade in pitch, wherein said constant velocity drive mechanism and pivoting arrangement comprises:

a first gimbal driven in rotation by said mast about said axis of the mast and mounted so as to pivot about a first diametral axis of the mast, which is substantially perpendicular to said axis of the mast, by two first bearings diametrically opposite relative to said axis of the mast, a second gimbal also driven in rotation by said mast about said axis of the mast, and mounted so as to pivot about a second diametral axis of said mast, which is substantially perpendicular to said axis of the mast and to said first diametral axis and converging therewith substantially on said axis of the mast, by two second bearings diametrically opposite relative to said axis of the mast, said first gimbal being in addition hinged to said hub by two first ball joint connections, diametrically opposite relative to said axis of the mast and each centred substantially in a plane defined by said axis of the mast and said second diametral axis, said second gimbal being in addition hinged to said hub by two second ball joint connections, diametrically opposite relative to said axis of the mast and each centred substantially in a plane defined by said axis of the mast and said first diametral axis in such a way that the blades are driven in rotation by two torque transmission trains each comprising said mast, one respectively of the gimbals, the corresponding two ball joint connections and two bearings, and said hub said torque transmission trains having substantially the same torsional rigidity, and at least one of the components of each torque transmission train having a flexibility in deformation about the axis of rotation of the hub.

2. A rotor according to claim 1, wherein said hub comprises at least two parts made flexible in relative torsion about the axis of rotation of the hub by characteristics of at least one of shapes and materials constituting said parts of the hub to each of which one respectively of the two gimbals is hinged by the two corresponding ball joint connections.

3. A rotor according to claim 1, wherein each of said gimbals is produced with at least one of a shape and materials providing flexibility of said gimbals in deformation about the axis of rotation of the hub.

4. A rotor according to claim 1, wherein said flexibility in deformation is exhibited by said mast, which comprises at least two parts made flexible in relative torsion about the axis of the mast and formed by at least one substantially axial feature made in the mast selected from the group consisting of a slot, a groove and a cut-away portion, with each of the gimbals being pivoted and driven in rotation by one respectively of said parts of the mast made flexible in torsion.

5. A rotor according to any claim 1, wherein that said mast comprises at least two torsion tubes having substantially equal rigidity in torsion and which are integral with each other in rotation about said axis of the mast at one axial end capable of being driven in rotation, each of the two gimbals being mounted so as to pivot on one respectively of the two torsion tubes about one respectively of the two diametral axes.

6. A rotor according to claim 5, wherein the two torsion tubes are coaxial, arranged one inside the other, and integral in rotation about the axis of the mast at their ends at said one axial end of the mast, the tube which is innermost being integral, at its opposite axial end with a coaxial sleeve on which the corresponding gimbal is mounted so as to pivot about the corresponding diametral axis.

7. A rotor according to claim 1, wherein the bearings for pivoting the gimbals relative to said mast are one of cylindrical and conical laminated bearings, substantially coaxial about respectively the first and second diametral axes.

8. A rotor according to claim 7, wherein the bearings have substantially matching radial rigidities.

9. A rotor according to claim 1, wherein the bearings for pivoting the gimbals relative to said mast comprise spherical laminated elements substantially centred on one respectively of the diametral axes.

10. A rotor according to claim 9, wherein the bearings have substantially matching radial rigidities relative to said diametral axes.

11. A rotor according to claim 1, wherein the ball joint connections of the hinges of the gimbals on the hub comprise ball joints associated with one of substantially coaxial cylindrical laminated bearings and substantially coaxial conical laminated bearings, providing radial and axial flexibility relative to the corresponding diametral axis, between two rigid members respectively in an inner and outer radial position, a first of which is attached to the corresponding gimbal, and a second of which is attached to the hub.

12. A rotor according to claim 1, wherein the ball joint connections of the hinges of the gimbals to the hub comprise laminated ball joints.

13. A rotor according to claim 1, wherein said first and second gimbals are driven in rotation about said axis of the mast by respectively a first and a second drive arm, integral in rotation with said mast first and second drive arms having axes which are respectively the first and second diametral axes of said mast.

14. A rotor according to claim 13, wherein each of the drive arms comprises two end fittings axisymmetric about the corresponding diametral axis, diametrically opposite and projecting radially outwardly from said mast, and each retained in one respectively of the two bearings for pivoting the corresponding gimbal relative to said mast.

15. A rotor according to claim 14, wherein the two end fittings of each drive arm project radially outwardly and are integral with a central drive barrel fitted around the mast and integral in rotation with the mast about its axis.

16. A rotor according to claim 14, wherein the mast comprises at least two torsion tubes having substantially equal rigidity in torsion and which are integral with each other in rotation about said axis of the mast at one axial end capable of being driven in rotation, each of the two gimbals being mounted so as to pivot on one respectively of the two torsion tubes about one respectively of the two diametral axes and wherein the two end fittings of each drive arm project radially outwardly and are integral with one respectively of the two torsion tubes.

17. A rotor according to claim 11, wherein said second member of each combined hinge with ball joint and laminated bearing is attached to a hub casing which surrounds the two gimbals, and their pivot bearings and hinges, and is attached to a hub plate connected to the blades and having a central opening through which said mast runs.

18. A rotor according to claim 17, wherein said hub plate is a plate in the form of a star with outward extending arms one for each blade and to each of which are fitted couplings for retaining and hingeing its blade in pitch.

19. A rotor according to claim 7, wherein each laminated bearing for pivoting a gimbal is a conical bearing converging radially outwardly, an outer radial member of which is annular and attached in a cut-away portion of corresponding shape of the corresponding gimbal, and an inner radial member of which is tubular and integral with an end fitting for driving by said mast.

20. A rotor according to claim 1, wherein the hub is also connected to the mast by a least one assembly for elastic return of the hub to a rest position substantially perpendicular to said axis of the mast.

21. A rotor according to claim 20, wherein said elastic return assembly comprise at least one half of a central laminated spherical thrust bearing, of which an outer member is connected to the hub and an inner member is integral in rotation with the mast.

22. A convertible aircraft comprising at least one tilting rotor moveable from a first position in which the or each tilting rotor operates as an aeroplane propeller to a second position in which the or each tilting rotor operates as a helicopter main lifting rotor, the or each tilting rotor comprising:

a rotor mast, capable of being driven in rotation about its longitudinal axis, a hub connected to said mast by a constant velocity drive mechanism and pivoting arrangement, allowing pivoting of the hub as a whole about any flapping axis converging with the axis of the mast and perpendicular to said axis of the mast, in such a way that said hub is capable of being driven in constant velocity rotation by said mast, about a geometrical axis of rotation of the hub which may be inclined in any direction about the axis of the mast, and at least two blades, each linked to said hub by a coupling retaining and hingeing its blade in pitch, wherein said constant velocity drive mechanism and pivoting arrangement comprises:
- a first gimbal driven in rotation by said mast about said axis of the mast and mounted so as to pivot about a first diametral axis of the mast, which is substantially perpendicular to said axis of the mast, by two first bearings diametrically opposite relative to said axis of the mast,
- a second gimbal also driven in rotation by said mast about said axis of the mast, and mounted so as to pivot about a second diametral axis of said mast, which is substantially perpendicular to said axis of the mast and to said first diametral axis and converging therewith substantially on said axis of the mast, by two second bearings diametrically opposite relative to said axis of the mast,
- said first gimbal being in addition hinged to said hub by two first ball joint connections, diametrically opposite relative to said axis of the mast and each centred substantially in a plane defined by said axis of the mast and said second diametral axis,
- said second gimbal being in addition hinged to said hub by two second ball joint connections, diametrically opposite relative to said axis of the mast and each centred substantially in a plane defined by said axis of the mast and said first diametral axis in such a way that the blades are driven in rotation by two torque transmission trains each comprising said mast, one respectively of the gimbals, the two ball joint connections and the corresponding two bearings, and said hub said torque transmission trains having substantially the same torsional rigidity, and at least one of the components of each torque transmission train having a flexibility in deformation about the axis of rotation of the hub.

* * * * *